United States Patent [19]

Price

[11] 4,422,533
[45] Dec. 27, 1983

[54] SEALING MEANS FOR HYDRAULIC BRAKE ACTUATORS

[75] Inventor: Anthony G. Price, Birmingham, England

[73] Assignee: Lucas Industries Limited, Birmingham, England

[21] Appl. No.: 282,080

[22] Filed: Jul. 10, 1981

[30] Foreign Application Priority Data

Jul. 10, 1980 [GB] United Kingdom ................. 8022677

[51] Int. Cl.³ .................. F16D 55/20; F16J 15/32
[52] U.S. Cl. .................................. 188/71.4; 188/72.2; 188/72.6; 192/70; 277/165; 277/191
[58] Field of Search ............... 188/71.4, 71.5, 72.2, 188/72.3, 72.6, 72.7, 72.8; 192/70; 277/165, 190, 191, 207 R

[56] References Cited

U.S. PATENT DOCUMENTS

| 2,874,807 | 2/1959 | Hahn | 188/71.4 |
| 3,542,379 | 11/1970 | Woodling | 277/207 X |
| 3,942,610 | 3/1976 | Klane | 192/70 |
| 4,156,532 | 5/1979 | Kawaguchi et al. | 277/165 |
| 4,276,963 | 7/1981 | Anderson | 188/72.2 |

FOREIGN PATENT DOCUMENTS

| 879211 | 4/1953 | Fed. Rep. of Germany | 188/71.4 |
| 1775481 | 8/1971 | Fed. Rep. of Germany | 277/165 |
| 2326047 | 12/1973 | Fed. Rep. of Germany | 277/165 |
| 726809 | 3/1955 | United Kingdom | 277/165 |
| 1043331 | 9/1966 | United Kingdom . | |
| 1190937 | 5/1970 | United Kingdom . | |
| 1512778 | 6/1978 | United Kingdom . | |
| 2004334 | 3/1979 | United Kingdom . | |

*Primary Examiner*—Douglas C. Butler
*Assistant Examiner*—R. R. Diefendorf
*Attorney, Agent, or Firm*—Scrivener, Clarke, Scrivener & Johnson

[57] ABSTRACT

A brake actuator comprises a piston working in a cylinder with a seal carried by the piston for engagement with the outermost wall of the cylinder and a seal housed in the innermost wall of the cylinder for engagement with the piston. Each seal is of triangular outline and is received in a seal-receiving groove which has first and second relatively inclined end walls with which faces on the seal are in full facial engagement, and a sealing region for engagement with the wall of the cylinder or the piston is defined by and between the third remaining face and the adjacent face of the seal. A space is provided between the second end wall and the third face to accommodate any deformation of the material of the seal which is otherwise confined between the piston and the cylinder.

3 Claims, 6 Drawing Figures

SEALING MEANS FOR HYDRAULIC BRAKE ACTUATORS

This invention relates to hydraulic brake actuators of the kind comprising hydraulic piston and cylinder assemblies in which a piston member works in a bore in a cylinder member, and an annular elastomeric seal housed in a radial seal-receiving groove in one of the members has a fluid-tight slidable sealing engagement with the other member.

Actuators of the kind set forth may be either separate from, or incorporated as an integral part of, a vehicle brake.

In known assemblies of the kind set forth the seal receiving groove is usually of a rectangular section, defined between parallel axially spaced end walls, and a longitudinally extending base wall which is continuous with the end walls at their inner ends, and the seal is compressed or nipped radially between the base wall and the said other member.

The compression of the seal between the base wall and the said other member causes the seal to bulge axially. Thus the end walls must be spaced apart by a distance sufficient to accommodate any such axial deformation, and the maximum deformation which can occur with adverse tolerance variations, for if the seal were to be nipped axially, control over the predicted degree of radial nip would be lost.

As a consequence of this axial looseness, a certain amount of axial bodily movement of the seal within, and with respect to, the groove can occur. Thus, upon operation of the actuator to cause relative movement between the members, an additional volume of fluid will be required to compensate for any increase in the effective capacity of the piston and cylinder assembly due to movement of the seal with respect to the groove. Sometimes, this additional volume is quite insignificant, but in some constructions and installations this additional volume of fluid can be critical, for example in an annular piston brake actuator where two seals are required, and where the aggregate area of the seals exposed to the fluid can be as large as the area of the piston.

In addition tolerance variations in and between the seal and the groove are critical to ensure that friction between the seal and member with respect to which it is movable, and distortion of the seal with consequence increase in energy stored by the seal, are not substantial, particularly in constructions in which the seal and the member are capable of both relative axial and angular movement.

According to our invention in an hydraulic brake actuator of the kind set forth the seal in an unstressed condition is substantially of triangular outline having three main faces, and the seal-receiving groove is defined in one of the members between first and second end walls with which two of the main faces of the seal are in full facial contact, the end walls being relatively inclined, at least the second end wall also being inclined with respect to the axis of the cylinder, and the relative lengths of the faces and the end walls being so chosen that a sealing region of the seal defined by and between the third remaining face and the face in contact with the first end wall is in sealing engagement with the said other member, and a space is defined between the second end wall and the said third face to accommodate any deformation of the material of the seal which is otherwise confined between the walls of the groove and the said other member.

The sealing region constitutes a relatively small contact area with the said other member substantially at the corner of the seal, even when tolerances are generous. Seal friction is therefore correspondingly low which ensures that only minimal increase in energy stored by the seal will occur during relative axial and/or angular movement between the two members.

Where used herein to define the relative positions of the end walls, the term "inclined" is intended to include constructions in which the end walls may be of curved or arcuate or stepped outline.

The relative inclination between the end walls is chosen to be sufficiently steep for the seal to be located by its own resilience firmly against the first end wall which is on the low pressure side of the actuator, but is yet insufficiently steep for the seal to be nipped axially between the two end walls. The deformation of the material of the seal, due to its radial nip between the walls of the groove and the said other member, is therefore accommodated in the space between the seal and the second end wall on the high pressure side of the actuator. Allowing the seal material to bulge into such a space means that the radial nip is controllable and predictable, even though the seal is located firmly against the low pressure wall at all times.

The relative inclination of the two end walls as specified in the invention could be provided by having both walls inclined to the axis, or by having one wall normal to the axis and only the other wall inclined.

When a seal is subject to high pressures, it tends to extrude through the tiniest of gaps. However, the more abrupt the entry to the gap, the less easily will the seal extrude into it. So the low pressure side is preferably the one that is as abrupt as possible, and preferably also the low pressure end wall is formed normal to the axis. (The edge of the groove may be made substantially sharp for the same reason).

The seal-receiving groove may be provided in the wall of the cylinder member in which the piston member works. However, when the piston member and the cylinder member are both of annular outline, a first seal-receiving groove may be provided in the radially innnermost wall of the cylinder member and a second seal-receiving groove may be provided in the radially outermost wall of the piston member.

One embodiment of our invention is illustrated with accompanying drawings in which.

Figure 1:
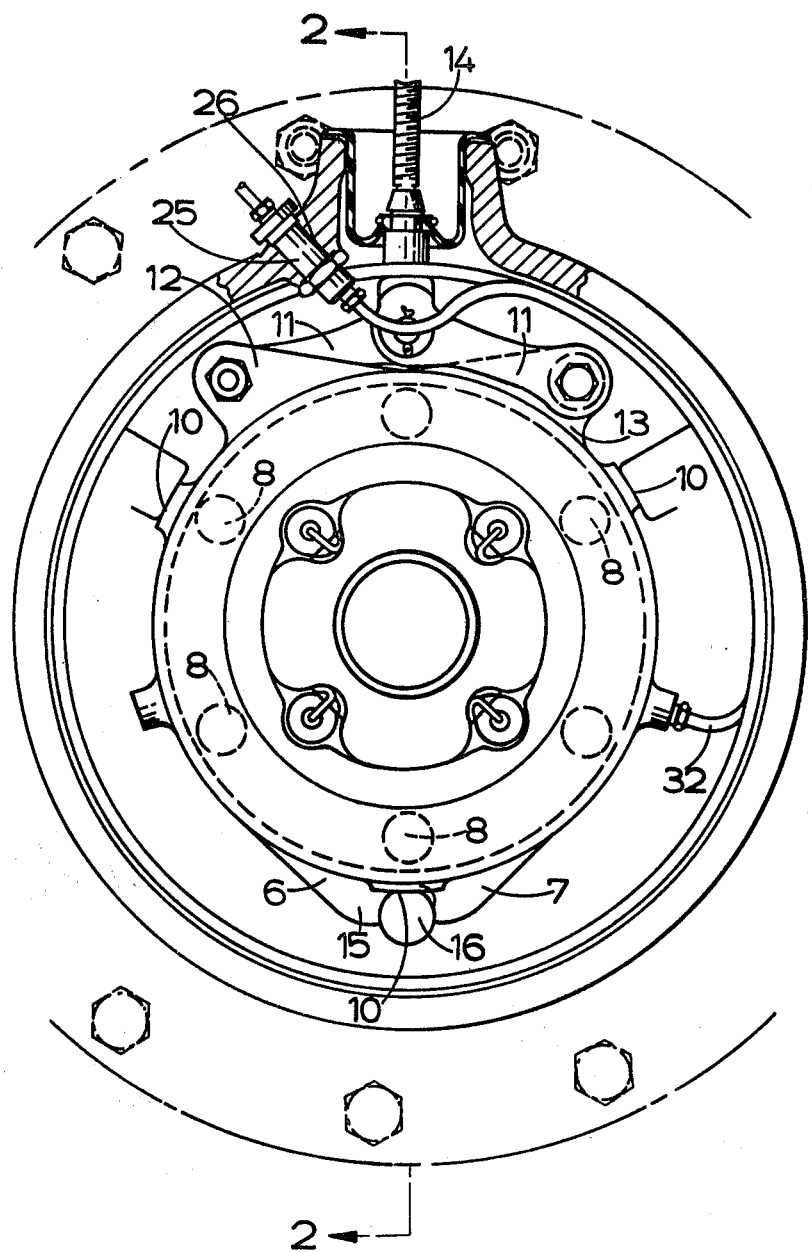
FIG. 1 is a view of a spreading brake along the axis of a shaft with one of the brake discs and part of the housing removed for clarity.
Figure 2:
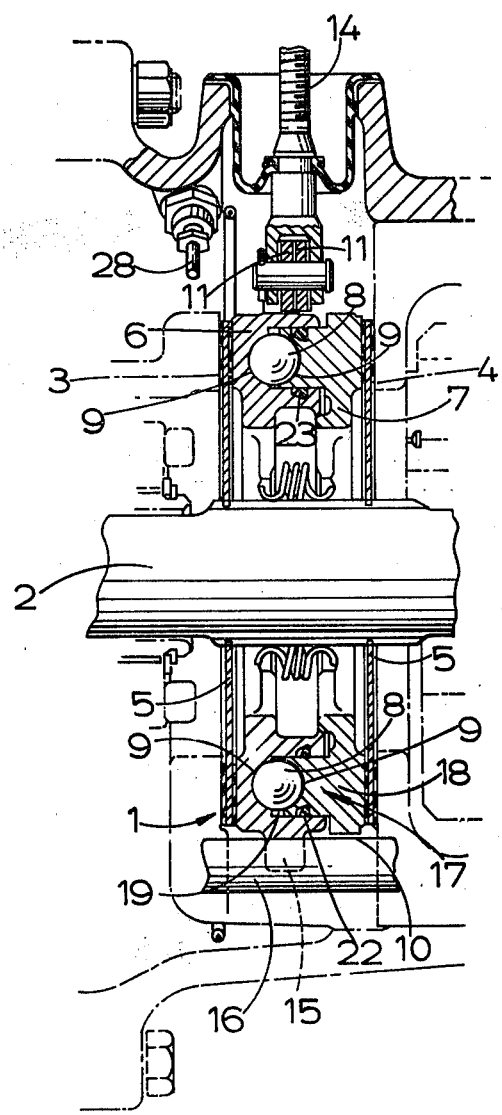
FIG. 2 is a section on the line 2—2 of FIG. 1.
Figure 3:
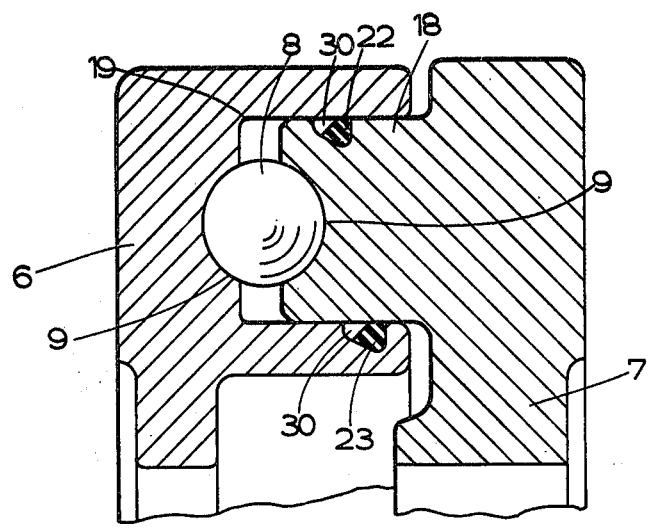
FIG. 3 is a portion of the brake on an enlarged scale.

The spreading brake illustrated in the drawings is adapted for braking a shaft for transmitting drive to a wheel of a vehicle. The brake comprises a housing 1 into which the shaft 2 extends, the housing having at opposite ends axially spaced radial braking surfaces 3, 4 between which are located rotatable friction discs 5. The discs 5 are slidably keyed to the shaft 2.

An expander mechanism is located between the discs 5. The mechanism comprises two angularly movable pressure plates 6 and 7 in the form of rings which are located between the discs 5, and balls 8 located in oppositely inclined co-operating recesses 9 in adjacent faces of the plates 6, 7. The plates are centred on angularly spaced pilots 10 in the housing 1.

A pair of toggle links 11, are connected between radially projecting lugs 12, 13 on the plates 6, 7 and one end of a pull-rod 14 is connected to the junction of the links 11. The other end of the pull-rod 14 is mounted in an actuator assembly for initiating application of the brake.

Movement of the pull-rod 14 in a radial brake-applying direction is effected by the actuator assembly and initiates angular movement of the pressure plates 6, 7 in relatively opposite directions. The balls 8 then tend to ride out of the recesses 9 and urge the plates apart into engagement with the friction discs 5 which are then urged into engagement with the radial surfaces 3, 4 in the housing. The pressure plates 6, 7 are carried round with the discs 5 until one of the plates, for example the plate 6, is arrested by the engagement of a lug 15 on that plate with a pin 16 which acts as a stop abutment and also comprises one of the pilots 10. Continued angular movement of the other pressure plate 7, known as the energising plate, provides a servo action to intensify the braking force.

The brake can also be operated hydraulically and, as illustrated, the expander mechanism incorporates an hydraulic piston and cylinder assembly 17. The assembly 17 comprises an annular piston 18 which is integral with the pressure plate 7 and an annular cylinder 19 in the pressure plate 6 in which the piston 18 works. The recesses 9 are provided in the free end of the piston 18, and in a wall at the adjacent inner end of the cylinder 19.

The piston 18 carries an annular seal 22 of elastomeric material, suitably rubber, for sealing engagement with the radially outermost wall of the cylinder 19, and the radially innermost wall of the cylinder 19 is provided with a similar annular seal 23 with which the innermost face of the piston 18 has a sealing engagement.

Hydraulic fluid under pressure, conveniently from a master cylinder, is admitted to the cylinder through a radial port in the plate 6 through a union 25 projecting outwardly through a radial opening 26 in the housing 1, which is sealed by a flexible sealing boot. A pipe line 28, conveniently of rubber, leads from the master cylinder to the union and the pipe-line 28 is flexible to compensate for any angular movement of the pressure plate 6.

When the brake is applied hydraulically the plates 6 and 7 are urged away from each other and into engagement with the discs. Thereafter the plates are carried round with the discs until one of the plates, for example the plate 6, is arrested by the stop abutment 16, as described above. Continued angular movement of the other pressure plate 7 then provides a servoaction to intensify the braking force in the same manner as if the brake had been applied by the pull-rod 14.

Normally the brake will be applied hydraulically for normal service braking, and by the pull-rod 14 for parking.

Seal-receiving grooves 30 are provided in the piston 18 and in the wall of cylinder 19 to accommodate the seals 22 and 23. Each groove 30 has a first end wall 31 disposed at the low pressure end of the piston 18 and normal to the longitudinal axis of the cylinder 19, a second end wall 32 disposed at the high pressure end of the piston 7 and extending from the inner end of the end wall 31 in a direction which is inclined towards the high pressure end of the piston 18, the second wall 32 being substantially longer than the first 31, and a radial wall 33 normal to the longitudinal axis of the cylinder 19 at which the end of the wall 32 remote from the wall 31 terminates. The angle of inclination between the end walls 31 and 32 is substantially 60°, and radiused corners 34 and 35 interconnect the end walls 31 and 32, and the walls 32 and 33.

Each annular seal 22, 23 in an unstressed condition is substantially of the outline of an equilateral triangle in cross-section. Each seal 22, 23 has a first end face 36 which is normal to the axis of the seal, a second outer face 37, and a third inner face 38, the latter two of which are inclined with respect to the face 36. Adjacent ends of the faces 36, 37 and 38 are interconnected by adjacent corners 39, 40 and 41.

Figure 4:
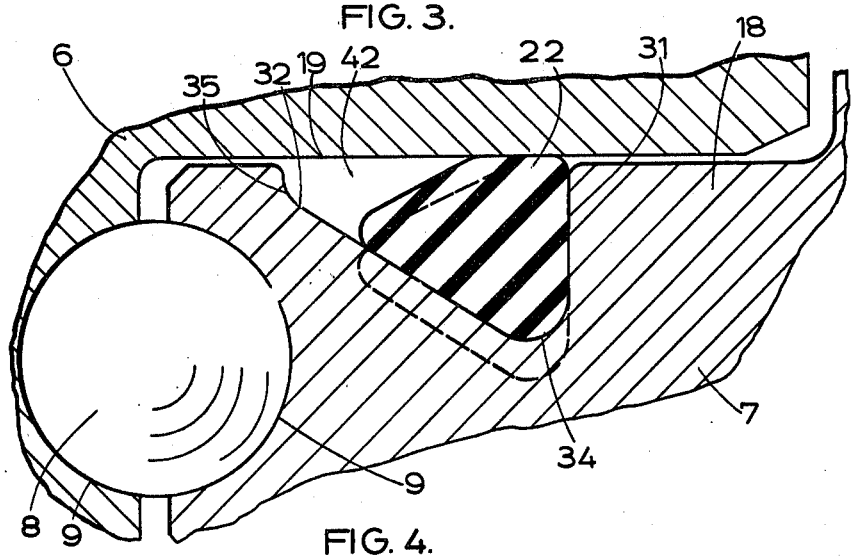
FIG. 4 is an enlarged section through a part of the brake which incorporates a seal.
Figure 5:
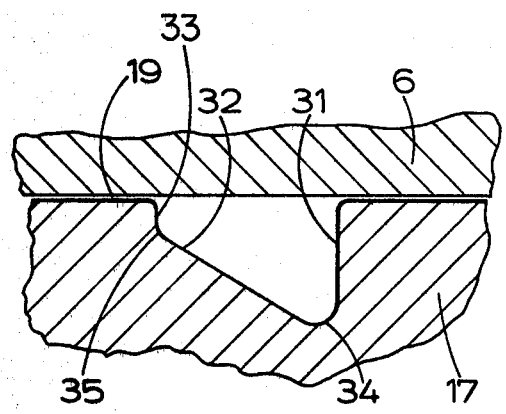
FIG. 5 is a section of the seal receiving groove.
Figure 6:
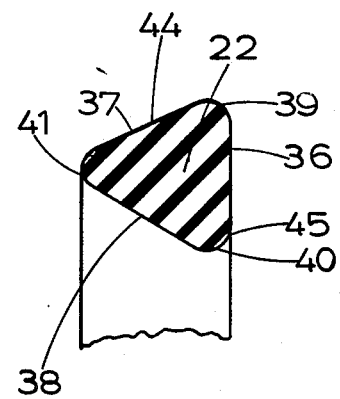
FIG. 6 is a section of the seal.

Each seal 22, 23 fits snugly within its groove 30 with the first end face 36 in full facial contact with the end wall 31, the inner face 38 in full facial contact with the second end wall 32, and the corner 40 in facial contact with the corner 34. The corner 39 of each seal engages with the cylinder 19 and with the piston 18, respectively, and the seal 4 is slightly deformed radially as shown particularly in FIG. 4.

The angles of inclination between the walls 31 and 32 cause the seals 22 and 23 to be pressed resiliently against the end walls 31 where they remain even though the piston 18 may be moved in a direction relatively away from the plate 6, so tending to move the seals 22, 23 in that direction, and even though a sudden release of the brake might produce a momentary vacuum on the high pressure side.

Any axial bulge of the seals 22, 23 due to radial constraint between the base wall 32 and the cylinder 19 and piston 18 respectively is accommodated in a clearance 42 between the seal and the second end wall 32.

The walls 31 and 32 of the groove 30 need not be straight provided the seal 22, 23 can fit snugly and does not move either bodily with respect to the groove 30, or by deflection when pressure is applied to it. For example, the base wall 32 may be of arcuate outline and merge with a portion of the end wall 31 which is also of arcuate outline, the seal being profiled complementarily.

In a modification the first end wall 31 may be inclined with respect to the longitudinal axis of the cylinder 19.

Irrespective of the precise configuration of the walls 31, 32, their relative inclination provides that the face 36 of the seal 22, 23 is at all times in full facial contact with the end wall 31 thus eliminating a requirement for additional hydraulic fluid to be supplied. Furthermore flash lines 44, 45 on the seals 22, 23 are isolated from the sealing surfaces.

A piston and cylinder assembly incorporating a seal as described above can be adapted for use in a number of different brakes. For example, it can be utilised as an integral part of a caliper of a disc brake assembly, or it can be utilised as an actuator for separating adjacent shoe-ends in an internal shoe-drum brake. However, the seal is particularly suitable for use in the brake described above where a generally helical relative motion between the plates 6 and 7 is described when the brakes are applied and this relative motion must be followed by the seals 22 and 23, substantially without leakage and any significant increase in energy stored in the seal.

The outer sealing corner 39 is well supported to prevent substantially the ingress of air.

Since the groove 30 is shaped to accommodate the seal 22, 23 as closely as is practical and with the seal 22, 23 deformed slightly in the groove 30, only slight or insignificant cavitation will occur on the low pressure side.

Although we have described a construction in which the seal 22, 23 is of the outline of an equilateral triangle it is to be understood that the seal 22, 23 may be elongated in either direction.

I claim:

1. An hydraulic brake actuator comprising a brake housing having end faces, a rotatable shaft extending through said housing, brake discs rotatable with said shaft for engagement with said end faces, and a pair of pressure plates which are adapted for relative axial and angular movement to urge said brake discs into engagement with said end faces of said brake housing, an annular piston member provided in one of said plates, an annular cylinder member provided in an adjacent face of the other of said plates and having a bore surrounding an axis in which said piston is adapted to work, means defining a first seal-receiving groove in the outer surface of said piston, a first annular seal located in said first groove for engagement with the outer face of said cylinder, a second means defining a second seal-receiving groove in the inner face of said cylinder, a second annular seal located in said second groove for sealing engagement with the inner face of said piston, and a high pressure space defined in said cylinder between a wall defining a closure for the inner end thereof and the inner end of said piston, wherein each said seal in an unstressed condition is substantially of triangular outline having three main faces, and each said seal-receiving groove is defined between first and second end walls with which two of said main faces of said seal are in full facial contact, said end walls being relatively inclined, at least said second end wall also being inclined with respect to said axis of said cylinder, and the relative lengths of said faces and said end walls being so chosen that a sealing region of said seal defined by and between the third remaining one of said faces and the one of said two faces which in contact with said first end wall is in sealing engagement with the said other member, and a space is defined between said second end wall and the said third face to accommodate any deformation of the material of said seal which is otherwise confined between said walls of the groove and the said other member, the space being disposed at ends of said seals which are adjacent to said high pressure space whereby to enhance said facial contact of said faces of said seal and said end walls.

2. An actuator as claimed in claim 1, wherein said seal is of the outline of an equilateral triangle having corners of arcuate outline.

3. An actuator as claimed in claim 1, wherein one of said end walls is normal to said axis and the other of said end walls is inclined to said axis.

* * * * *